(12) United States Patent
Barr

(10) Patent No.: US 6,198,047 B1
(45) Date of Patent: Mar. 6, 2001

(54) CABLE TRAY WITH POWER CHANNEL

(76) Inventor: Charles Barr, 2736 Franklin St., San Francisco, CA (US) 94123

( * ) Notice: Subject to any disclaimer, the term of this patent is extended or adjusted under 35 U.S.C. 154(b) by 0 days.

(21) Appl. No.: 09/246,683

(22) Filed: Feb. 8, 1999

(51) Int. Cl.[7] ........................................ H02G 3/04
(52) U.S. Cl. .................. 174/68.3; 174/68.1; 174/101; 248/49; 248/68.1
(58) Field of Search .......................... 174/48, 50, 50.54, 174/53, 63, 68.3, 72 C, 95, 97, 101, 68.1, 68.2; 248/49, 68.1

(56) References Cited

U.S. PATENT DOCUMENTS

| | | |
|---|---|---|
| 2,090,239 * | 8/1937 | Strang ............................. 174/72 C |
| 2,934,590 * | 4/1960 | Thompson et al. ................ 174/53 |
| 3,035,800 | 5/1962 | McLeod . |
| 3,042,351 | 7/1962 | Du Bois . |
| 3,053,358 | 9/1962 | Gross . |
| 3,135,469 * | 6/1964 | Hanson ............................. 174/48 |
| 3,351,699 | 11/1967 | Merckle . |
| 3,406,932 | 10/1968 | Burke . |
| 4,017,137 | 4/1977 | Parks . |
| 4,166,195 | 8/1979 | Schwab . |
| 5,123,618 | 6/1992 | Guterman et al. . |
| 5,131,860 | 7/1992 | Bogiel . |
| 5,162,614 * | 11/1992 | Bogiel et al. ....................... 174/97 |
| 5,323,988 | 6/1994 | Handler . |
| 5,614,695 | 3/1997 | Navazo . |
| 5,629,496 | 5/1997 | Navazo . |
| 5,659,151 | 8/1997 | Dale . |
| 5,784,841 * | 7/1998 | Nowell ............................. 174/72 C |
| 5,868,361 * | 2/1999 | Rinderer ............................. 248/49 |
| 5,971,509 * | 10/1999 | Deimen et al. ..................... 174/48 |

* cited by examiner

Primary Examiner—Kristine Kincaid
Assistant Examiner—Adolfo Nino
(74) Attorney, Agent, or Firm—Douglas E. White

(57) ABSTRACT

A hollow-spine cable tray has cable arms wherein the hollow channel of the body spine is adapted for running and holding electrical wiring. This is achieved by enlarging the spine, and thus its hollow channel, and by molding one side face of the spine so as to open outwardly except when covered by one or more snap-on cover plates. The cover plates may include mounts suitable for holding standard 110 or 220 volt electrical outlets, modular telephone jacks, or the like. Preferably, however, separate outlet plates bearing or adapted to bear the outlets are configured to snap on over the open face of the spine between adjacent cover plates.

18 Claims, 5 Drawing Sheets

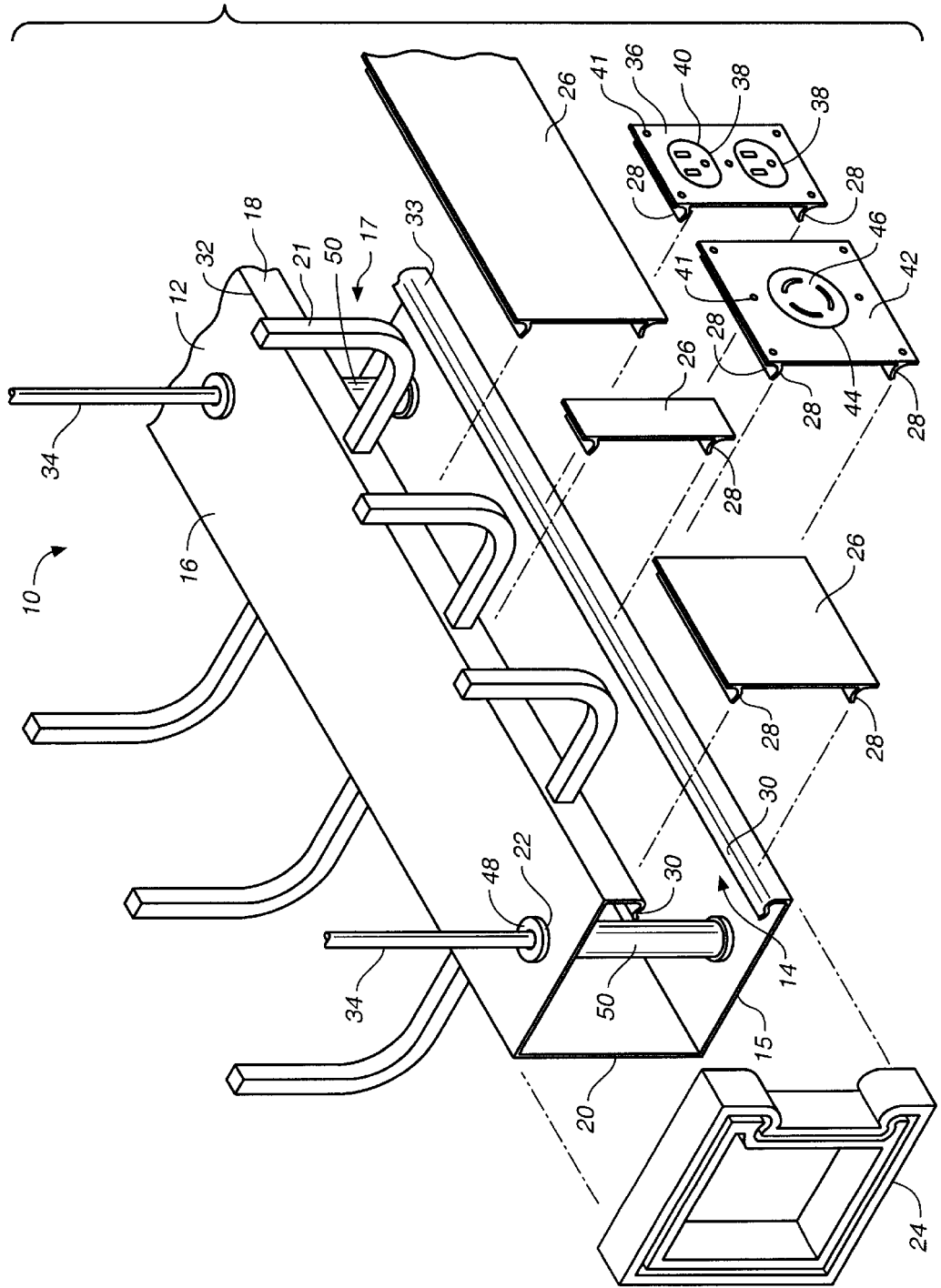
FIG._1

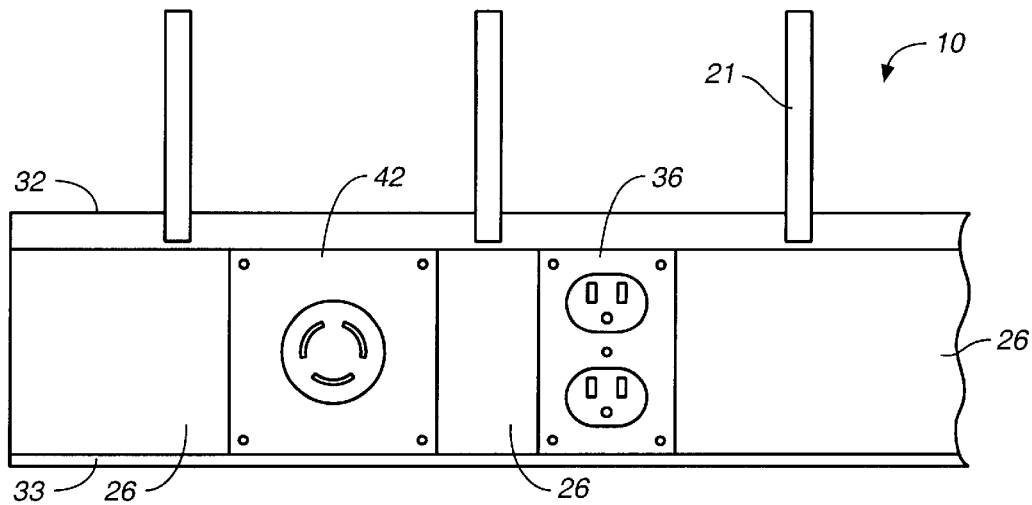
FIG._2
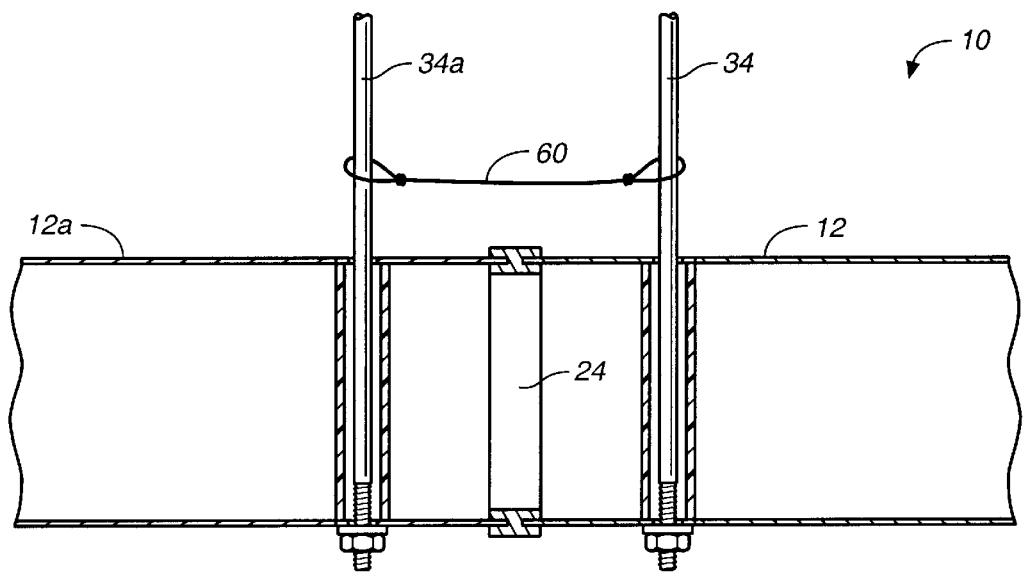
FIG._6

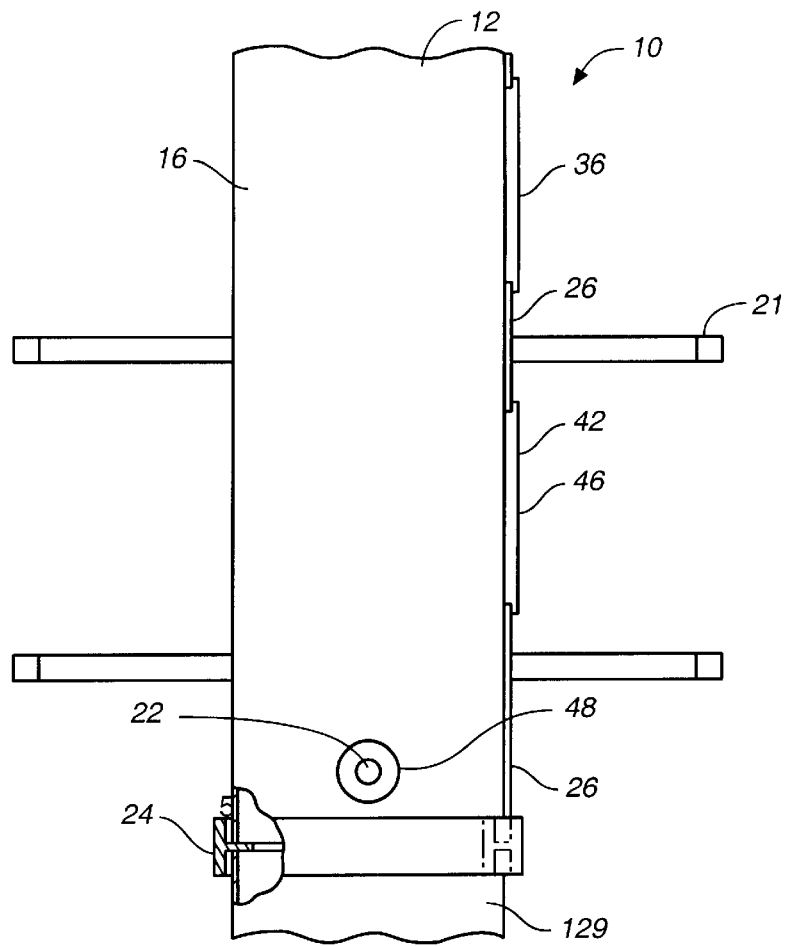
FIG._3
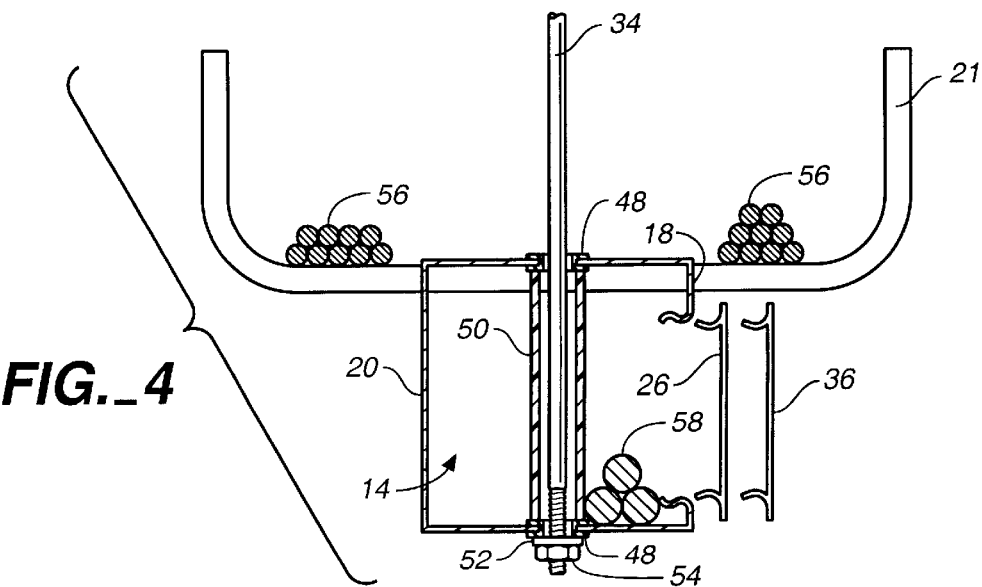
FIG._4

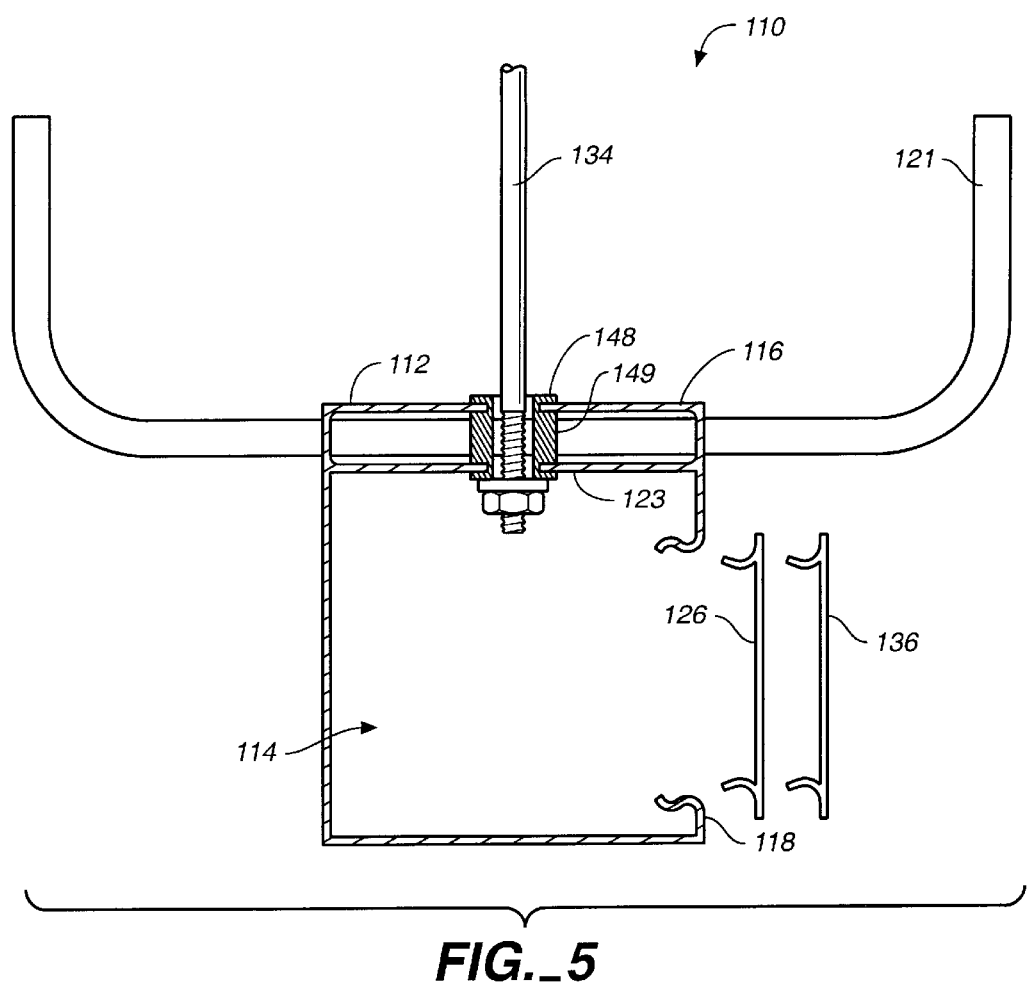
FIG._5

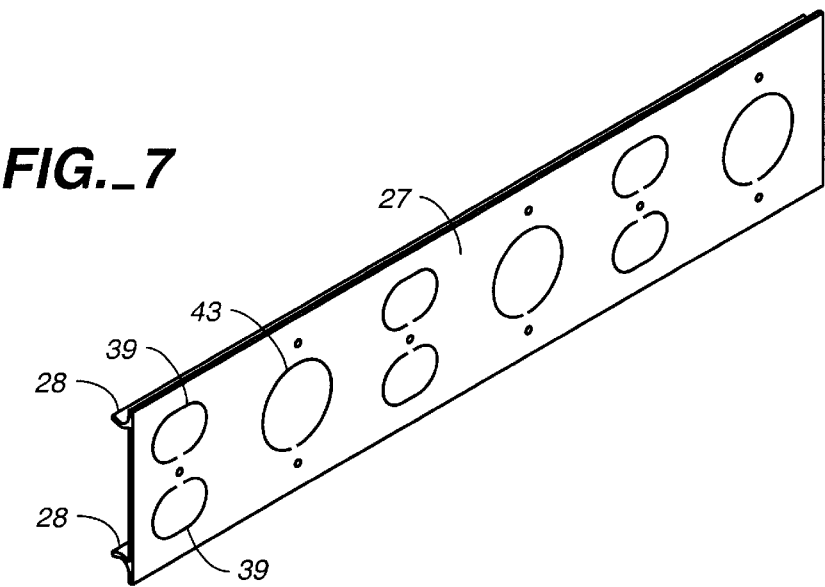
FIG._7
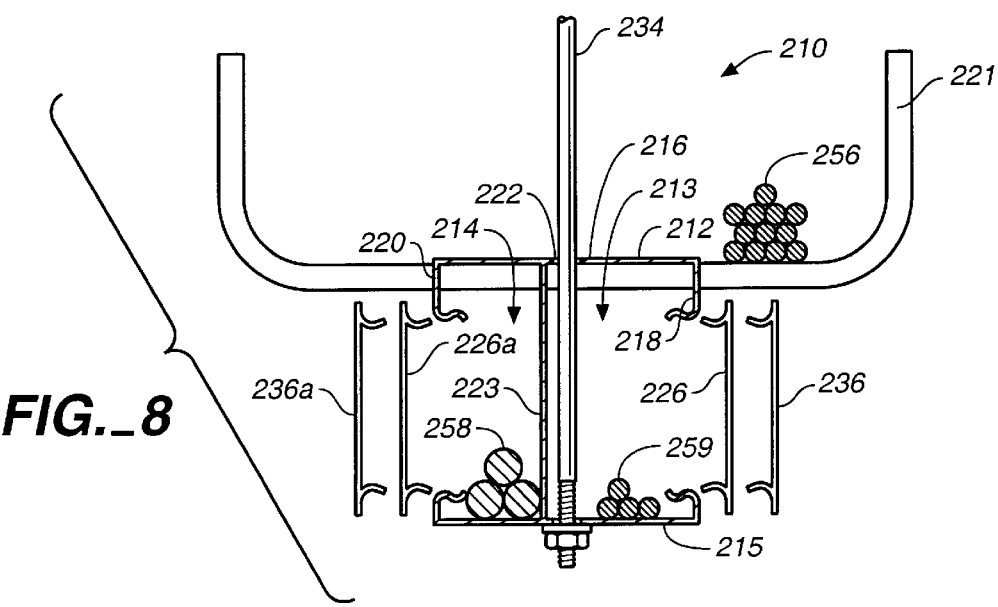
FIG._8

US 6,198,047 B1

CABLE TRAY WITH POWER CHANNEL

CROSS REFERENCE TO RELATED APPLICATIONS

Not applicable.

FEDERALLY SPONSORED RESEARCH OR DEVELOPMENT

Not applicable.

FIELD OF THE INVENTION

This invention relates to cable trays—more particularly, to a cable tray having a spine with at least one open side face, through which open face may be passed electrical wiring, or data networking or telephone cabling, for ducting through the hollow interior of the spine.

BACKGROUND OF THE INVENTION

Cable trays comprise beamed or spined members having regularly spaced transverse arms for cradling cables, wiring, tubes and the like, such as for computer networks, telecommunications and the like. Cable trays normally are suspended from ceilings on rods. In computer network installations, cable trays are used for routing network cables along the ceiling of a dedicated room to upright components known as racks. Occasionally, the cable trays might be laid out on top of the racks.

It is also necessary, however, to run electrical power into and around the room to the racks and to other related equipment. For purposes of isolating the electrical power wiring from interference with communication signals in the network cables, and for reasons of safety, electrical power wiring typically is carried within the hollows of separately mounted ducts called raceways. Prior art cable trays, which are limited to carrying externally exposed cabling, therefore are not suitable for electrical wiring. To run electrical wiring along the cable arms thereof would not be in compliance with building code requirements. In order to meet building code requirements and the IEEE specifications, a metallic barrier must separate electrical wiring and low voltage cabling.

Prior developments in this field may be generally illustrated by reference to the following information disclosure statement:

| U.S. Patent Documents | | |
| --- | --- | --- |
| U.S. Pat. No. | Patentee | Issue Date |
| 5,629,496 | J. Navazo | May 13, 1997 |
| 5,659,151 | J. Dale | Aug. 19, 1997 |
| 5,123,618 | D. Guterman et al. | Jun. 23, 1992 |
| 5,323,988 | I. Handler | Jun. 28, 1994 |
| 5,131,860 | S. Bogiel | Jul. 21, 1992 |
| 4,166,195 | A. Schwab | Aug. 28, 1979 |
| 4,017,137 | W. Parks | Apr. 12, 1977 |
| 5,614,695 | J. Benito Navazo | Mar. 25, 1997 |

U.S. Pat. Nos. 5,123,618 and 5,323,988 teach typical cable trays having arms that are designed to hold multiple strands of cable in a distribution system.

U.S. Pat. Nos. 5,131,860, 4,166,195, 4,017,137 and 5,614,695 teach electrical wiring raceways comprising hollow ducts with snap-on covers. Some of these covers feature knockout or punch-out tabs for accepting electrical outlets.

U.S. Pat. Nos. 5,629,496 and 5,659,151 teach other box-like hollow mechanisms having provisions for electrical outlets and wiring.

It is common to find cable trays and electrical raceways mounted side-by-side in a single installation, resulting in a great deal of duplication of effort, materials and the like—not to mention the amount of space wasted in rooms which often are no larger than closets. There has been no suggestion in the art that such unnecessary duplication could be eliminated were a single device to be designed to perform both functions safely.

Accordingly, there continues to be a need for a new and improved cable tray which addresses the problems of construction, effectiveness and ease of use that are attendant in the prior art. In this respect, the present invention substantially fulfills this need.

SUMMARY OF THE INVENTION

In view of the disadvantages inherent in the known art, the general purpose of the present invention, which will be described subsequently in greater detail, is to teach a new and improved cable tray with power channel which has all of the important advantages of the prior art and few, if any, of the disadvantages.

The present invention is a hollow-spine cable tray having cable arms wherein the hollow channel of the body spine (presently unused in the art) is adapted for running and holding electrical wiring. This is achieved by enlarging the spine, and thus its hollow channel, and by molding one side face of the spine so as to open outwardly except when covered by one or more snap-on cover plates.

The cover plates may include mounts suitable for holding standard 110 volt, 220 volt or NEMA outlets. Preferably, however, separate fixtures (herein "outlet plates") bearing or adapted to bear the outlets are configured to snap on over the open face of the spine between adjacent cover plates.

FEATURES AND ADVANTAGES

It is therefore an object of the present invention to provide a new and improved cable tray with power channel which has all, or nearly all, of the advantages of the prior art, while simultaneously overcoming most of the disadvantages normally associated therewith.

It is another object of the present invention to provide a new and improved cable tray with power channel which may be easily and efficiently manufactured and marketed.

A further object or feature of the present invention is a new and improved cable tray with power channel which is of a durable and reliable construction.

An even further object of the present invention is to provide a novel cable tray with power channel which is susceptible of a low cost of manufacture with regard to both materials and labor, and which accordingly is then susceptible of low prices of sale to the public, thereby making the cable tray with power channel economically available to the trade.

Still another object of the present invention is to provide a novel cable tray with power channel wherein an increased ease of assembly is permitted relative to the art.

Another object or feature is a new and improved cable tray with power channel that is easy to use, tidy in function and appearance, and suitable for mass production.

Accordingly, a feature of this invention is a cable tray including: a hollow spine elongated along a longitudinal axis; a top wall of said spine; a bottom wall of said spine; at least one open side face of said spine between said top and bottom walls, said open side face forming an elongated first opening parallel to said longitudinal axis; a plurality of cable arms mounted through said at least one open face perpendicular thereto and perpendicular to said longitudinal axis; and means for mounting at least one type of electrical outlet, said mounting means releasably engaged with said first opening.

A further feature is such an apparatus wherein said cable arms are U-shaped, and further including at least one snap-on cover plate releasably engaged with said first opening.

Still another feature is disclosed wherein said at least one snap-on cover plate includes said mounting means.

Another feature is wherein said mounting means is a plurality of opposed pairs of knockout tabs adapted to form apertures within which to engage said at least one type of electrical outlet.

In one preferred embodiment, said at least one type of electrical outlet is 110 volt.

A further feature is wherein said mounting means is at least one aperture within which to engage said at least one type of electrical outlet.

As a preferred feature, there are at least two snap-on outlet plates, namely, at least one 110 volt outlet plate having a pair of said at least one apertures within which to engage a first said type of electrical outlet, namely, a 110 volt electrical outlet, and at least one 220 volt (or, alternatively, a NEMA) outlet plate having one of said at least one apertures within which to engage a second said type of electrical outlet, namely, a 220 volt electrical outlet.

Another featured apparatus is one wherein there are two said open faces, namely, a first open face and a second open face, said first and second open faces mounted parallel to each other along opposite longitudinal edges of said top and bottom walls, said first open face forming said first opening, and said second open face forming a second opening parallel to said longitudinal axis, onto which second opening at least said snap-on cover plates may be snapped.

Yet another apparatus features at least one snap-on outlet plate, which said at least one outlet plate includes said mounting means, and features a code separation wall running parallel to said longitudinal axis and connecting said top and bottom walls.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWING

The invention will be better understood and objects other than those set forth above will become apparent when consideration is given to the following detailed description thereof. Such description makes reference to the annexed drawing wherein:

FIG. 1 is a broken exploded perspective view of a first preferred cable tray with power channel of this invention;

FIG. 2 is a broken right side elevation of the device of FIG. 1;

FIG. 3 is a broken plan view of the device of FIG. 1;

FIG. 4 is an exploded cross sectional frontal elevation of the device of FIG. 1;

FIG. 5 is an exploded cross sectional frontal elevation of a second preferred cable tray with power channel of this invention;

FIG. 6 is a broken cross sectional right side elevation showing the interconnection of a pair of the devices of FIG. 1;

FIG. 7 is a perspective view of an alternate embodiment of the cover plate of the device of FIG. 1; and FIG. 8 is an exploded cross sectional frontal elevation of a third preferred cable tray with power channel of this invention.

| Drawing Reference Numerals | |
|---|---|
| 10 | cable tray with power channel |
| 12 | spine |
| 12a | spine |
| 14 | power channel |
| 15 | bottom |
| 16 | top |

-continued

Drawing Reference Numerals

| | |
|---|---|
| 17 | opening |
| 18 | open face |
| 20 | closed face |
| 21 | cable arm |
| 22 | rod aperture |
| 24 | connector |
| 26 | cover plate |
| 27 | tabbed cover plate |
| 28 | male flange |
| 30 | female flange |
| 32 | upper stub wall |
| 33 | lower stub wall |
| 34 | ceiling rod |
| 34a | ceiling rod |
| 36 | 110 V outlet plate |
| 38 | aperture |
| 39 | knockout tab |
| 40 | 110 V outlet |
| 41 | screw hole |
| 42 | 220 V outlet plate |
| 43 | knockout tab |
| 44 | aperture |
| 46 | 220 V outlet |
| 48 | ring |
| 50 | spacer |
| 52 | washer |
| 54 | nut |
| 56 | cables |
| 58 | electrical wiring |
| 60 | tie |
| 110 | cable tray with power channel |
| 112 | spine |
| 114 | power channel |
| 116 | top |
| 118 | open face |
| 121 | cable arm |
| 123 | reinforcement wall |
| 126 | cover plate |
| 134 | ceiling rod |
| 136 | outlet plate |
| 148 | insulator |
| 149 | shaft |
| 210 | cable tray with power channel |
| 212 | spine |
| 213 | telephone channel |
| 214 | power channel |
| 215 | bottom |
| 216 | top |
| 218 | open face |
| 220 | open face |
| 221 | cable arm |
| 222 | rod aperture |
| 223 | code separation wall |
| 226 | cover plate |
| 226a | cover plate |
| 234 | ceiling rod |
| 236 | outlet plate |
| 236a | outlet plate |
| 256 | cables |
| 258 | electrical wiring |
| 259 | telephone cabling |

It is to be noted that, for convenience, the last two positions of the reference numerals of alternative embodiments of the invention duplicate those of the numerals of the embodiment of FIG. 1, where reference is made to similar or corresponding parts. However, it should not be concluded merely from this numbering convention that similarly numbered parts are equivalents.

DETAILED DESCRIPTION OF THE INVENTION

Referring to FIG. 1, there is illustrated therein a first preferred cable tray with power channel 10 of this invention. Cable tray 10 principally comprises a hollow, longitudinally-extended, beam-like spine 12, which spine is pierced by a regularly spaced plurality of U-shaped cable arms 21 arranged transversely with respect to the spine 12 (perpendicular to its longitudinal axis). Preferably, the spine is extruded aluminum, but it can be fabricated by standard means from plastic or any of a number of equivalent materials. Preferably, the cable arms 21 also are aluminum. The cable tray 10 preferably is suspended from the ceiling of a room from a series of ceiling rods 34, or it may be laid on top of equipment or other horizontal surfaces. The ceiling rods 34 travel though rod apertures 22 in both the bottom 15 and the top 16 of the spine 12. Except for the apertures 22, the top and bottom walls are generally closed. Turning briefly to FIG. 4, it can be seen that bundles of cables 56 may be laid loosely along the tops of both sides of the cable arms 21 so as to run parallel to the longitudinal axis of the spine 12. This much is standard in the art.

Novel to this invention is an open face 18 on at least one side of the spine 12 (the right side in FIG. 1). Preferably, the opposite side will have a closed face 20. The top 16 and bottom 15 also are continuous panels, giving the spine 12 an overall "C" shape. The open face 18 has an opening 17, formed between an upper stub wall 32 and a lower stub wall 33, which opening extends along the entire length of the spine 12.

At least one, and preferably a plurality, of cover plates 26 snap onto the stub walls by means of opposed pairs of male flanges 28 on the backs of the cover plates 26, which male flanges 28 compress and mate with opposed pairs of female flanges 30 (or simple edges) found on the bottom of the upper stub wall 32 and the top of the lower stub wall 33, respectively. Preferably, such snap-on cover plates are "closed," i.e., they are continuous (without apertures) so as to be able to fully cover whatever portion of the opening 17 onto which they are snapped.

Additionally, electrical outlets are provided, or at least means for mounting at least one electrical outlet (preferably a variety of types of such outlets), such as outlet mounting plates therefor. A 110 V outlet plate 36 forms a pair of apertures 38 adapted to mount and hold a standard 110 V outlet 40. Plate 36 has an opposed pair of male flanges 28 for snapping the 110 V outlet plate 36 onto the female flanges or edges of the upper stub wall 32 and lower stub wall 33.

A 220 V outlet plate 42 forms an aperture 44 adapted to hold a standard 220 V outlet 46 and has an opposed pair of male flanges 28 for snapping the 220 V outlet plate 42 onto the female flanges 30 of the stub walls. Other types of outlet plates can be provided for standard outlets, such as the NEMA type (not illustrated).

As seen in FIG. 2, a suitable assortment of cover plates 26, 110 V outlet plates 36, and 220 V outlet plates 42 may be assembled together to allow the entire opening 17 of the open face 18 to be closed. Furthermore, individual cover plates 26 may be cut to size where necessary, so as to allow particular outlet plates 36, 42 to be precisely positioned wherever desired along any length of spine.

The novel provision of an open face 18 allows the hollow interior channel of the spine 12 to be used as a power channel 14, i.e., suitable bundles of electrical wiring 58 may be stuffed through the opening 17 into the power channel 14, where they may run unimpeded throughout the longitudinal extent of the cable tray with power channel 10 (FIG. 4). Therein, the electrical wiring 58 is sufficiently isolated as to prevent interference with the telecommunication cables 56 carried externally on the cable arms 21. Furthermore, once the opening 17 is fully closed by a full length of cover plates 26, 110 V outlet plates 36, and 220 V outlet plates 42, the electrical wiring 58 is covered from view and touch. Provided proper insulation and grounding is provided to the spine 12 when required, storage of electrical wiring 58 in the power channel 14 should meet all applicable code requirements.

FIG. 4 illustrates one means for electrically insulating the spine 12 of a cable tray with power channel 10 from the ceiling rods 34, which rods connect the device 10 to the external environment. As noted above, each ceiling rod 34 passes through rod apertures 22 in the top 16 and the bottom 15 of the spine 12. A nut 54 threaded on the end of each ceiling rod 34 bears the weight of the apparatus 10, perhaps aided by a washer 52 or the like. Where electrical insulation between the spine 12 and the ceiling rods 34 is desired, rubber or similar insulating rings 48 in the rod apertures 22 shield each ceiling rod 34 from electrical contact with the spine 12. A tubular insulating spacer 50 may be provided between the top and bottom of the spine. Spacers 50 could perform the dual function of insulating the ceiling rods 34 from electrical contact with the electrical wiring 58 while providing structural support between the top 16 and the bottom 15 walls of the spine 12.

FIGS. 3 and 6 illustrate the manner in which abutting adjacent lengths of spine 12 and 12a may be interconnected by means of a C-shaped connector 24 to form a unitary cable tray with power channel 10 of any desired length. If desired, the two ceiling rods 34 and 34a nearest the interconnected ends of spine may be tied together by a simple tie 60 (FIG. 6) or similar means, where desired to prevent longitudinal movement during earthquake, storm or the like. FIG. 6 also illustrates the fact that the insulating rings 48 of FIG. 4 possibly may be eliminated—for example, for use of the device in applications wherein electrical insulation is not needed. For example, the channel 14 might be used to carry telephone cables rather than power wires.

Screw holes 41 are positioned in the outlet plates as required to hold in the outlets 40, 46. Holes may be provided, if desired, for screwing the outlet plates onto the stub walls, for added security.

FIG. 7 illustrates an alternate form of tabbed cover plate 27 for use on the device 10 of FIG. 1, namely, one which is designed to be used without separate outlet plates (such as outlet plates 36 and 42). In tabbed cover plate 27 a regularly spaced plurality of means for mounting at least one type of electrical outlet (preferably a variety thereof), is provided, namely, a large plurality of opposed pairs of knockout (punch-out) tabs 39 adapted to form apertures within which to engage 110 V outlets 40 and a large number of knockout tabs 43 adapted to form apertures within which to engage 220 V outlets 46. As before, the back side of the tabbed cover plate 27 contains opposed pairs of male flanges 28 for snapping the tabbed cover plate 27 onto the open face 18 of a cable tray with power channel 10. A single tabbed cover plate 27 of standard length (matching the length of a standard spine 12) can be used to cover the open face 18. Alternatively, the tabbed cover plate 27 and spine 12 can be cut to length at the job site.

Referring to FIG. 5, there is illustrated therein a second preferred cable tray with power channel 110 of this invention. Cable tray 110 principally comprises a hollow, longitudinally-extended, beam-like spine 112, which spine is pierced by a regularly spaced plurality of cable arms 121. Preferably, the cable tray is extruded aluminum, but it can be fabricated by standard means from plastic or any of an number of equivalent materials. The cable tray 110 preferably is suspended from the ceiling of a room from a series of ceiling rods 134. In this embodiment, a horizontal reinforcement wall 123 has been added just below, and parallel to, the top wall 116 of the C-shaped spine 112. The ceiling rods 134 travel though rod apertures in both the top 116 and the reinforcement 123 walls. This feature creates a larger power channel 114 than the previous embodiment, but requires more material to construct.

At least one, and preferably a plurality, of cover plates 126 snap onto the open face 118. A variety of electrical outlets, or at least mounting plates therefor, are provided—for example, outlet plate 136.

FIG. 5 illustrates a second means for electrically insulating the spine 112 of a cable tray with power channel 110 from the ceiling rods 134, which rods connect the device 110 to the external environment. Where electrical insulation between the spine 112 and the ceiling rods 134 is desired, a one-piece insulating ring 148 travels from the top wall 116 to the reinforcement wall 123 to shield each ceiling rod 134 from electrical contact with the spine 112. Essentially, the insulator 148 incorporates the tubular insulating spacer 50 of the previous embodiment shown in FIG. 1, by means of having an elongated central shaft 149.

Referring to FIG. 8, there is illustrated therein a third preferred cable tray with power channel 210 of this invention. Cable tray 210 principally comprises a hollow, longitudinally-extended, beam-like spine 212, which spine is pierced by a regularly spaced plurality of cable arms 221 arranged transversely with respect to the spine 212 at right angles to its longitudinal axis. Preferably, the spine and cable arms 221 are extruded aluminum. The cable tray 210 is suspended from the ceiling of a room from a series of ceiling rods 234, or it may be laid on top of equipment or other horizontal surfaces. The ceiling rods 234 travel though rod apertures 222 in both the bottom 215 and the top 216 of the spine 212. Bundles of cables 256 may be laid loosely along the tops of either or both sides of the cable arms 221 so as to run parallel to the longitudinal axis of the spine 212. This much of FIG. 8 is, again, standard in the art.

Novel to this invention is an open face 218 on a first vertical side of the spine 212 (the right side in FIG. 8). In this embodiment, the opposite second vertical side also has a novel open face 220. At least one vertical code separation wall 223 travels the length of the hollow interior of the spine 212, dividing the hollow interior into two channels: on the right, a telephone channel 213 and, on the left, a power channel 214. Alternatively, there could be two such vertical separation walls, one on either side of the ceiling rods 234, in order to assure that the weight of the device is supported evenly. However, this result also can be accomplished with one interior wall 223 if the rod apertures are drilled slightly off to the opposite side of the central longitudinal axis. This latter alternative (shown in FIG. 8) conserves material. The top 216 and bottom 215 also are continuous panels, giving the spine 212 an overall reclining "H" shape.

As before, the open face 218 has an opening formed between an opposed pair of stub walls. At least one, and preferably a plurality, of cover plates 226 snap or screw onto the stub walls by means of opposed pairs of male flanges on the backs of the cover plates 226, which male flanges compress and mate with opposed pairs of female flanges found on the stub walls. A variety of telephone outlets or telephone outlet holders, such as outlet plate 236 for a modular phone jack, are provided for snapping or screwing onto the open face 218.

The second open face 220 has an opening formed between an opposed pair of stub walls. At least one, and preferably a plurality, of cover plates 226a snap onto the stub walls by means of opposed pairs of male flanges on the backs of the cover plates 226. A plurality of means for mounting at least one electrical outlet, preferably a variety thereof, such as outlet plate 236a, are provided for snapping onto the open face 220.

The novel provision of the open face 220 allows the left side of the hollow interior channel of the spine 212 to be used as a power channel 214, i.e., suitable bundles of electrical wiring 258 may be stuffed therein. On the right, the telephone channel 213 carries separate bundles (or a single cable) of telephone cabling 259.

If insulation and grounding is required by applicable code requirements for storage of electrical wiring 258 in the power channel 214, such may be provided to the spine 212. In FIG. 8, however, no special insulation is shown (being the configuration the invention will assume where no insulation is required). However, suitable insulating members, such as ring 48 of the embodiment of FIG. 1 or the insulator 148 of the embodiment of FIG. 5 may be provided. Furthermore, the ceiling rod 234 itself may be made (or covered) with electrically insulating material.

As to the manner of usage and operation of the instant invention, the same should be apparent from the above disclosure, and accordingly no further discussion relative to the manner of usage and operation of the instant invention need be provided.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

For example, the cover plates and/or outlet plates may be affixed to the open faces by alternate means—the snap-on flanges might be eliminated and replaced by a hinging arrangement or, where a more permanent arrangement is desired, perhaps simply by screws or rivets. The female flanges could be eliminated from the stub walls, whereby the male flanges of the cover plates and outlet plates would simply snap onto the edges of the stub walls. These types of releasable plates are equivalent to the snap-on plates described above.

Therefore, the above description and illustrations should not be construed as limiting the scope of the invention, which is defined by the appended claims.

What is claimed is:

1. A cable tray including:

a hollow spine elongated along a longitudinal axis;

a top wall of said spine;

a bottom wall of said spine;

at least one open side face of said spine between said top and bottom walls, said open side face forming an elongated first opening parallel to said longitudinal axis;

a plurality of cable arms mounted through said at least one open side face perpendicular thereto and perpendicular to said longitudinal axis; and means for mounting at least one type of electrical outlet, said mounting means releasably engaged with said first opening.

2. The apparatus of claim 1 wherein:

said cable arms are U-shaped, and further including at least one snap-on cover plate releasably engaged with said first opening.

3. The apparatus of claim 2 wherein:

said at least one snap-on cover plate includes said mounting means.

4. The apparatus of claim 3 wherein:

said mounting means is a plurality of opposed pairs of knockout tabs adapted to form apertures within which to engage said at least one type of electrical outlet.

5. The apparatus of claim 4 wherein:

said at least one type of electrical outlet is 110 V.

6. The apparatus of claim 2 further including:

at least one snap-on outlet plate releasably engaged with said first opening.

7. The apparatus of claim 6 wherein:

said at least one snap-on outlet plate includes said mounting means.

8. The apparatus of claim 7 wherein:

said mounting means is at least one aperture within which to engage said at least one type of electrical outlet.

9. The apparatus of claim 8 wherein:

there are at least two snap-on outlet plates, namely, at least one 110 V outlet plate having a pair of said apertures within which to engage a first said type of electrical outlet, namely, a 110 V electrical outlet, and at least one 220 V outlet plate having one said aperture within which to engage a second said type of electrical outlet, namely, a 220 V electrical outlet.

10. The apparatus of claim 2 wherein:

said at least one open side face is, namely, a first open side face and a second open side face, said first and second open side faces mounted parallel to each other along opposite longitudinal edges of said top and bottom walls, said first open side face forming said first opening, and said second open side face forming a second opening parallel to said longitudinal axis, onto which second opening said at least one snap-on cover plate also may be releasably engaged.

11. The apparatus of claim 10 further including:

at least one snap-on outlet plate, which said at least one outlet plate includes said mounting means; and a code separation wall running parallel to said longitudinal axis and connecting said top and bottom walls.

12. A cable tray including:

a hollow spine elongated along a longitudinal axis;

a generally closed top wall of said spine;

a generally closed bottom wall of said spine;

at least one open side face of said spine between said top and bottom walls, said open side face forming an elongated first opening parallel to said longitudinal axis;

a plurality of U-shaped cable arms mounted through said at least one open side face perpendicular thereto and perpendicular to said longitudinal axis;

at least one cover plate releasably engaged with said first opening; and means for mounting at least one type of electrical outlet, said mounting means releasably engaged with said first opening.

13. The apparatus of claim 12 further including:

a plurality of ceiling rods passing through at least said top wall; and means for electrically insulating said spine from said ceiling rods.

14. The apparatus of claim 13 further including:

at least one outlet plate releasably engaged with said first opening, which said at least one outlet plate includes said mounting means, and wherein said ceiling rods pass through both said top and said bottom walls.

15. The apparatus of claim 14 wherein:

said mounting means is at least one aperture within which to engage said at least one type of electrical outlet.

16. The apparatus of claim 15 wherein:

there are at least two outlet plates, namely, at least one 110 V outlet plate having a pair of said apertures within which to engage a first type of electrical outlet, namely, a 110 V electrical outlet, and at least one 220 V outlet plate having one said aperture within which to engage a second type of electrical outlet, namely, a 220 V electrical outlet.

17. The apparatus of claim 16 wherein:

said at least one open side face is, namely, a first open side face and a second open side face, said first and second open side faces mounted parallel to each other along opposite longitudinal edges of said top and bottom walls, said first open side face forming said first opening, and said second open side face forming a second opening parallel to said longitudinal axis, onto which second opening said at least one cover plate and said 110 V and 220 V outlet plates may be releasably engaged.

18. The apparatus of claim 13 further including:

a horizontal reinforcement wall running parallel to said longitudinal axis and connected to said at least one open side face, wherein said plurality of ceiling rods also pass through said reinforcement wall.

* * * * *